Dec. 7, 1971  J. W. TIBBET  3,624,903
CUTTER FOR ENERGIZED POWER LINES
Filed Aug. 26, 1969  2 Sheets-Sheet 1
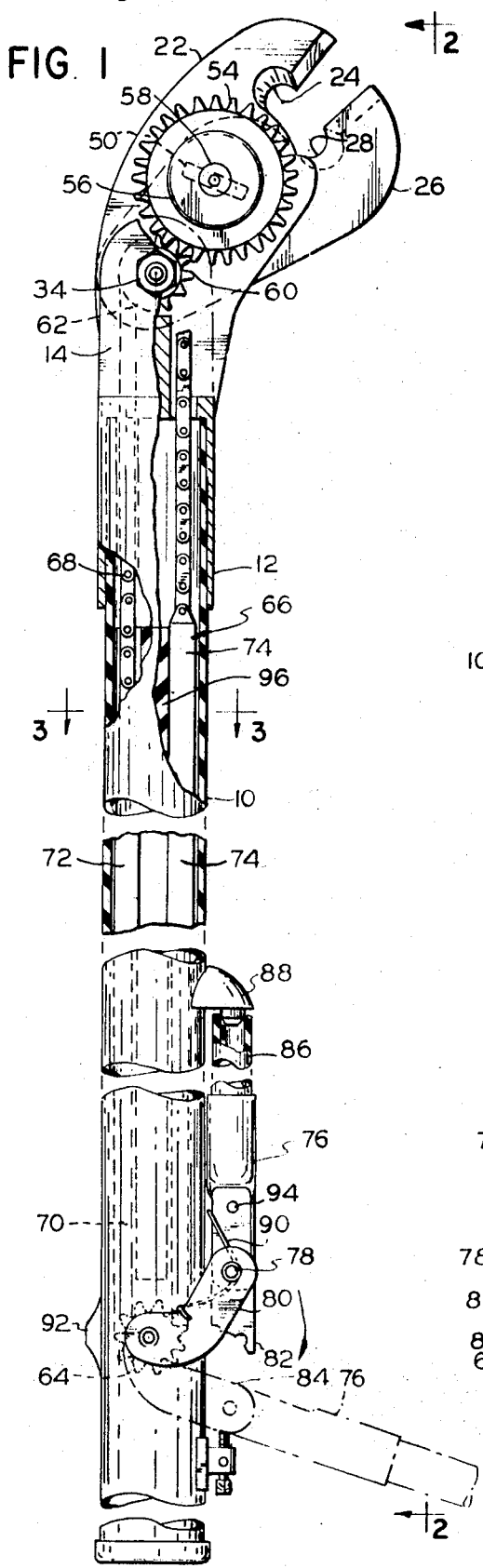
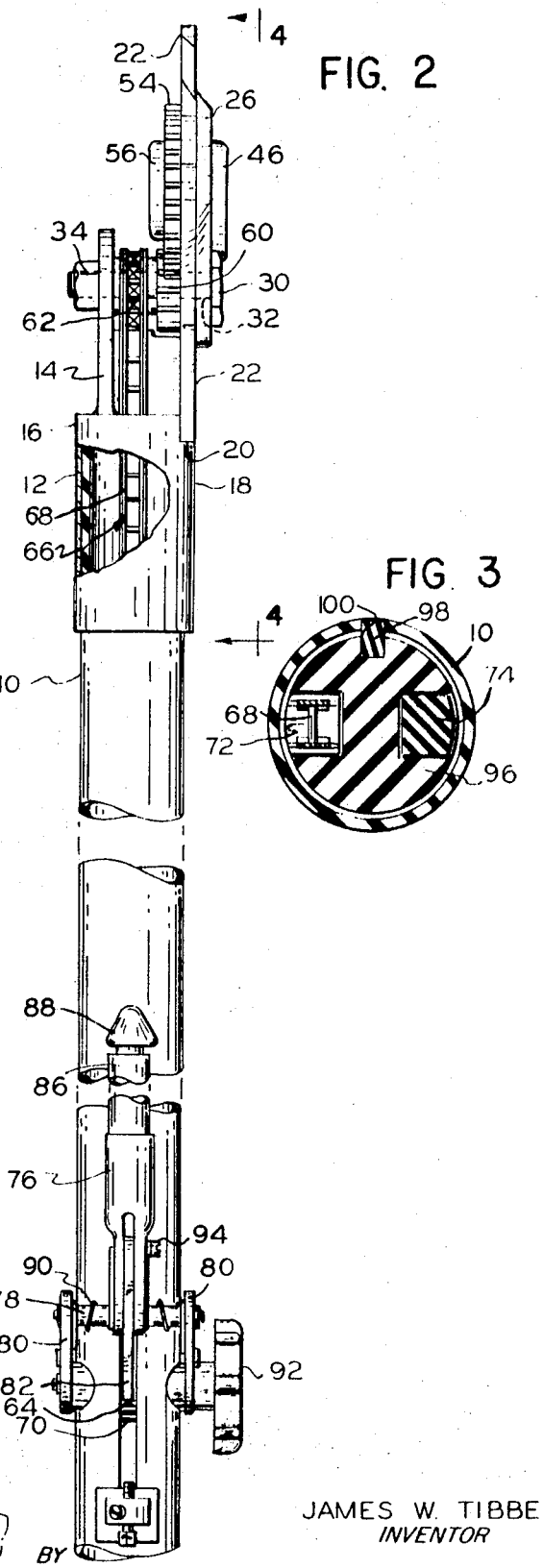
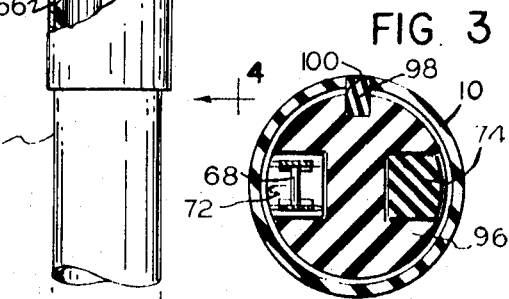
JAMES W. TIBBET
INVENTOR
BY
BUCKHORN, BLORE, KLARQUIST & SPARKMAN
ATTORNEYS

JAMES W. TIBBET
*INVENTOR*

BY
BUCKHORN, BLORE, KLARQUIST & SPARKMAN
*ATTORNEYS*

3,624,903
CUTTER FOR ENERGIZED POWER LINES
James W. Tibbet, Rte. 1, Box 94, Gold Hill, Oreg. 97525
Filed Aug. 26, 1969, Ser. No. 853,082
Int. Cl. B26b 13/26
U.S. Cl. 30—238                    7 Claims

ABSTRACT OF THE DISCLOSURE

A cable cutting tool for energized power lines having a fixed cutting head mounted on one end of an elongated handle and a movable cutting head attached to the fixed cutting head. Cam means are provided to rotate the movable cutting head both laterally and longitudinally of the fixed cutting head to subject a cable placed between the heads to a combined compression and shearing cutting action. A linkage disposed within the body of the tool provides the necessary mechanical advantage to the cam means.

BACKGROUND OF THE INVENTION

This invention relates to cutting devices for energized power lines and, more particularly, to a cable cutting tool that will be able to make cuts without appreciably distorting the cut ends.

The tools that are presently available for the cutting of energized power lines generally consist of an insulated handle on one end of which is mounted a pair of hot cutters. The cutters have sharp edges and are designed to move in a direction perpendicular to those edges so as to subject a length of cable placed therebetween to a cutting action which is directed radially only. Thus, as the cutters are closed about the length of cable, the cutting edges tend to flatten or distort the cable especially when the same is made of stranded wire. A cable end so flattened or distorted hampers the mounting thereupon of automatic sleeves or deadends which are generally provided with a rounded entrance for the cable to enter.

Energized cable cutters presently available are also generally provided with a long lever protruding to one side of the cutting head. The lever is connected by a rod to a handle upon which the cutting force is applied. When the apparatus is stored, this handle must be disassembled, which is a time consuming operation. Furthermore, the cutting heads on presently available tools are generally of a large size requiring a considerable amount of space during transportation and storage.

It is thus the principal object of the present invention to provide a cutting tool for energized power lines that will avoid flattening or distorting the cable adjacent the cut ends.

A further object of the present invention is to provide such a cutting tool that will cut ACSR (aluminum cable steel reinforced) safely and with a minimum of effort.

A still further object of the present invention is to provide such a cutting tool that can be conveniently transported and stored, requiring only a small space.

A still further object of the present invention is to provide a cutting tool that will not require the removing of any parts except for repair or maintenance.

A still further object of the present invention is to provide such a cutting tool that will make it possible easily to change and adjust the angle of the cutting head.

SUMMARY OF THE INVENTION

The cable cutting tool of the present invention comprises an elongated handle, a fixed cutting head mounted on one end of the handle, a movable cutting head attached to the fixed cutting head, and cam means adapted to rotate the movable cutting head and move the same longitudinally of the fixed cutting head. A cable placed between the cutting heads will thus be subjected to a combined radially directed compression and shearing cutting action during movement of the heads.

The cutting tool of the present invention, by virtue of the cutting action above described, will not flatten or distort the cable during cutting of the same. Thus, sleeves and dead ends may be mounted upon the cut ends with a minimum of difficulty.

BRIEF DESCRIPTION OF THE DRAWINGS

FIG. 1 is a side elevational view, with parts broken away, of the cable cutting tool of the present invention.

FIG. 2 is an elevational view taken on line 2—2 of FIG. 1.

FIG. 3 is a cross-sectional view taken on line 3—3 of FIG. 1.

DESCRIPTION OF THE PREFERRED EMBODIMENT

Figure 4:
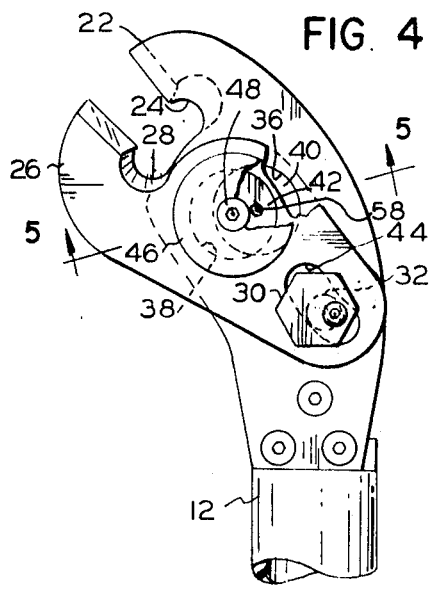
FIG. 4 is a side elevational view taken on line 4—4 of FIG. 2 and showing the cutting heads of the cable cutting tool of the present invention in their maximum open position.

Referring to the drawings, the cable cutting tool of the present invention consists of an elongated, insulated tubular handle 10 on one end of which is mounted a base fitting 12. A lug 14 extends adjacent one side 16 of the base fitting 12. The other side 18 of the fitting 12 is recessed to provide a shoulder 20 on which is attached a fixed cutting head 22 provided with a sharpened, generally semicircular cable receiving cutting edge 24.

A movable cutting head 26 having a complementary, generally semicircular cable receiving cutting edge 28, is attached to the fixed cutting head 22, being furnished lateral support by a flat hex head 30 attached to an axle 32 threadedly received in the fixed cutting head 22 and the lug 14 of the base fitting 12 and provided with a locking nut 34. (See FIG. 2.)

Figure 5:
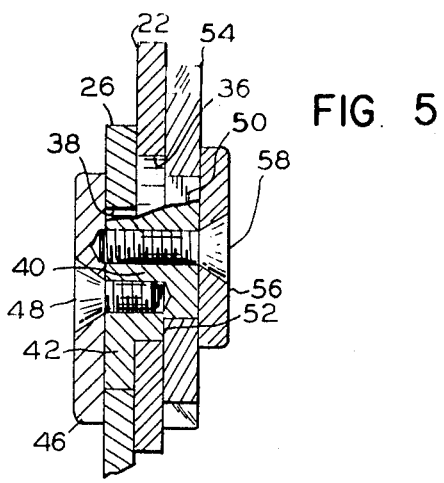
FIG. 5 is a cross-sectional view taken on line 5—5 of FIG. 4.

The fixed cutting head 22 is provided with a centrally located circular hole 36 and the movable cutting head 26 is provided with an offset circular hole 38 having the same diameter as the hole 36. (See FIG. 5.) Cam means in the form of two eccentrically attached circular disks 40, 42 received in holes 36 and 38, respectively, further serve to attach the movable cutting head 26 to the fixed cutting head 22 and provide the movable cutting head 26 with the lateral and longitudinal motion with respect to the fixed cutting head 22 which is a feature of the present invention. The movable cutting head 26 is further provided with an elongated slot 44 through which the axle 32 passes to permit the head 26 to achieve the eccentric motion to be hereinafter described.

A retaining disk 46 is attached to the assembly by means of a flush head screw 48 received in the disks 42 and 40 and furnishes additional lateral support for the movable head 26. The eccentric disk 40 is also provided with a rectangular key 50 on the side 52 thereof to connect the same to a large gear 54. A retaining disk 56 attached by means of a flush head screw 58 to the eccentric disks 40 and 42 maintains the gear 54 in position against the fixed cutting head 22.

The gear 54 is maintained in constant engagement with a smaller gear 60 mounted on the axle 32 and attached to a sprocket 62 also mounted on the axle 32. A second sprocket 64 is mounted within the handle 10 remote from the sprocket 62. A linkage 66, consisting of two sections of chain 68, 70 trained around sprockets 62 and 64, respectively, joined by insulated rods 72, 74 (see FIG. 1) and movable in two directions, passes around the sprockets 62, 64. The linkage 66 is encased within the insulated handle 10 which is of sufficient length to meet all safety requirements. Rod 74, being on the tension side of the linkage 66 during closing of the cutting heads, is of heavier construction than rod 72.

A guide 96 of insulated material adapted to ride on a key 98 attached to the tubular handle 10 is affixed to each end of the insulated rod 74. Guide 96 has a slot 100 therein to receive the key 98 and is provided with similar recesses to accommodate the several moving components of the linkage 66, thereby to retain the same properly oriented within the handle 10.

A lever arm 76 pivotally mounted on a rod 78 supported by brackets 80 mounted on the sides of the handle 10 and equipped with a pawl 82 attached to the arm 76 by a brass shear pin 94 is adapted to engage the chain 70 so that when the arm 76 is pulled in a direction away from the cutting heads, the hinged edge 84 thereof causes the pawl 82 to engage the chain 70 and move the same one link per stroke. The lever arm 76 is pushed toward the cutting heads to reset it for another stroke. The lever arm 76 thus provides the power necessary to rotate the gears 60 and thus 54 to cause the cutting heads 22 and 26 to cut a cable placed therebetween. The pin 94 is designed to shear upon the application of excessive force to the arm 76, thereby to avoid damage to the linkage 66.

The free end 86 of the lever arm 76 is recessed to engage with a latch 88 attached to the handle 10, being urged against the latch by a coil spring 90 attached to the lever arm 76 and to the rod 78. It will be observed that the limit of travel of the linkage 66 is predetermined by the length of the chain 68 that is connected to the insulated rods 72 and 74 that travel the length of the handle 10 between the sprockets 62 and 64.

An adjusting knob 92 attached to the sprocket 64 and mounted on the handle 10 permits coarse adjustment of the heads 22 and 26 and also permits the grip thereof to be released following completion of a cut. The amount of leverage provided by the arm 76 moving the linkage 66 one link per stroke permits cutting of the cable with a minimum of effort.

It will be noted that no particular force is required to retain the base fitting 12 onto the handle 10 other than the assembly thereof. Actuation of the cutting heads 22 and 26 does not place any tension force on the base fitting 12. Any force exerted thereupon is minimal and of a compressive nature.

The operation of the cable cutting tool of the present invention is as follows: The adjusting knob 92 is rotated to open the cutting heads 22 and 26 to their maximum open position as shown in FIG. 4. The knob 92 is then rotated in the opposite direction to close the heads about the cable at the point of the desired cut. By this means, the tool can be locked onto the cable without danger of the tool falling and, if desired, the lineman can move to a more advantageous position to complete the cut without having to hold the tool at arm's length.

The lever arm 76 is then released from its latch 88 by pushing the arm 76 against the pressure of the spring 90. Rotating the arm 76 in a direction away from the cutting heads causes the pawl 82 to engage the chain 70 and move the same one link. The lever arm 76 is then pushed toward the cutting heads to reset it for another stroke. By this means, the arm 76 provides the necessary leverage to cut the cable with a minimum of effort.

Figure 6:
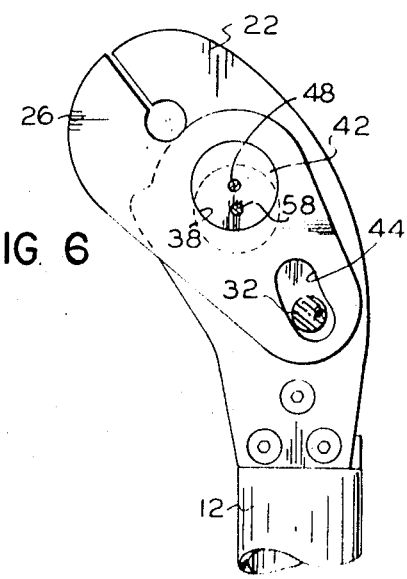
FIG. 6 is a view similar to FIG. 4 showing the cutting heads as they commence their grip upon a cable to be cut.
Figure 7:
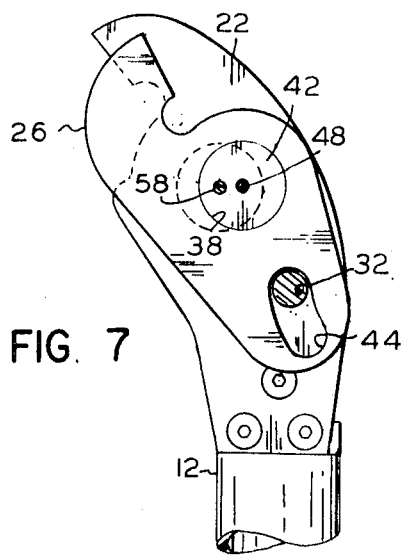
FIG. 7 is a view similar to FIG. 6 showing the cutting heads in the position they occupy at the completion of a cut.

As the lever arm 76 causes the movable cutting head 26 to close about the cable, it will be seen that the first direction of the closing motion is generally in a transverse direction. (See FIG. 6.) Continued action by the lever arm 76 then causes the direction of the movable cutting head 26 to assume a generally longitudinal component, moving axially along the handle 10 as well as transversely thereof until the axle 32 bottoms on the slot 44 (see FIG. 7).

Thus, the cutting action is seen to be a combination of a radially directed compression, that is, a compression force on the cable in a generally transverse direction with respect to the handle of the tool, together with a shearing cutting action, that is, a cutting action that is directed generally axially with respect to the handle of the tool. This combined cutting action cuts the cable but does not flatten or distort the cut ends thereof.

Other advantages of the cutting tool of the present invention are that it requires a lesser amount of space for storage than do prior tools. It is always ready to use inasmuch as there is nothing to assemble before a cut. It will also save lineman time because of its ability to cut both solid and stranded cable without distortion, thereby easing the operation of applying automatic sleeves and dead ends.

The tool of the present invention can be locked onto a conductor without danger of falling, thus to permit the lineman to move to an advantageous position to complete his cut without having to hold the weight of the tool at arm's length. The tool is thus safer to use. Furthermore, the tool of the present invention can be used in tight places inasmuch as no lever arm protrudes adjacent the cutting heads.

I claim:
1. A cable cutting tool comprising
   an elongated handle;
   a fixed cutting head mounted on one end of said handle;
   a movable cutting head rotatably attached to said fixed cutting head; and
   cam means adapted to rotate said movable cutting head and move the same longitudinally of said fixed cutting head, said cam means comprising
      a pair of offset holes, one in each of said cutting heads;
      a pair of eccentrically attached circular disks received one in each of said holes; and
      gear means attachable to said disk received in said fixed cutting head to rotate the same and thereby eccentrically rotate said disk received in said movable cutting head;
   whereby a cable placed between said cutting heads will be subjected to a combined radially directed compression and shearing cutting action.
2. A cable cutting tool as in claim 1 further comprising
   an elongated slot in said movable cutting head; and
   an axle received within said slot, said axle being attached to said fixed cutting head, said movable cutting head being adapted to rotate about said axle, said axle bottoming on said slot on the termination of longitudinal movement of said movable cutting head.
3. A cable cutting tool as in claim 2 in which said gear means comprise
   a first gear attached to said disk received in said fixed cutting head;
   a second gear axially mounted on said axle and engageable with said first gear; and
   linkage means enclosed within said handle to rotate said second gear upon actuation thereof.
4. A cable cutting tool as in claim 3 in which said linkage means comprise
   a first sprocket mounted on said axle and attached to said second gear;
   a second sprocket mounted within said handle remote from said first sprocket;

a first section of chain trained around said first sprocket;

a second section of chain trained around said second sprocket;

an insulated rod connecting the ends of each of said sections of chain; and lever means to rotate said sections of chain on said sprockets.

5. A cable cutting tool as in claim 4 in which said lever means comprise a lever pivotally mounted exteriorly of said handle adjacent said second sprocket; and a pawl mounted on said lever and adapted to engage said second section of chain, whereby actuation of said lever causes said pawl to engage said second section of chain and move the same one link per stroke.

6. A cable cutting tool as in claim 4 further comprising an adjusting knob exteriorly mounted on said handle and attached to said second sprocket to rotate the same and quickly adjust the movement of said movable cutting head with respect to said fixed cutting head.

7. A cable cutting tool as in claim 4 further comprising insulated guide means attached to the ends of at least one of said rods; and key means attached to said handle;

said guide means being provided with slot means to receive said key means and ride thereupon, thereby properly to orient said linkage means within said handle during movement of said linkage means.

References Cited

UNITED STATES PATENTS

| | | | |
|---|---|---|---|
| 425,820 | 4/1890 | Nelson | 30—238 |
| 514,082 | 2/1894 | Kamphaus | 30—239 |
| 2,280,159 | 4/1942 | Neal | 30—251 X |
| 2,742,698 | 4/1956 | McGary | 30—237 |
| 2,993,275 | 7/1961 | Naito | 30—250 |

FOREIGN PATENTS

| | | | |
|---|---|---|---|
| 94,712 | 2/1939 | Sweden | 30—238 |

THERON E. CONDON, Primary Examiner

J. C. PETERS, Assistant Examiner